United States Patent [19]

Ferguson et al.

[11] 4,439,478

[45] Mar. 27, 1984

[54] HEAT SEALABLE, MULTI-PLY POLYPROPYLENE FILM

[75] Inventors: Daniel F. Ferguson, Spartanburg; Frederick D. Stringer, Greenville; Michael D. Esakov, Greer, all of S.C.

[73] Assignee: W. R. Grace & Co., Cryovac Division

[21] Appl. No.: 368,598

[22] Filed: Apr. 15, 1982

Related U.S. Application Data

[63] Continuation of Ser. No. 152,970, May 23, 1980, abandoned.

[51] Int. Cl.³ .............................................. B32B 27/08
[52] U.S. Cl. .................................... 428/137; 428/213; 428/349; 428/515; 428/516; 525/240
[58] Field of Search ............... 428/516, 515, 349, 213, 428/137; 525/240

[56] References Cited

U.S. PATENT DOCUMENTS

| 3,220,966 | 11/1965 | Flanagan | 525/240 X |
| 3,285,766 | 11/1966 | Barkis et al. | 264/290.2 X |
| 3,671,383 | 11/1968 | Sakata et al. | 428/516 X |
| 4,132,050 | 1/1979 | Young | 428/516 X |
| 4,148,972 | 4/1979 | Yamane et al. | 428/516 X |

FOREIGN PATENT DOCUMENTS

| 1055803 | 1/1967 | United Kingdom . |
| 1145199 | 3/1969 | United Kingdom . |
| 1168541 | 10/1969 | United Kingdom . |
| 1209392 | 10/1970 | United Kingdom ............... 428/515 |
| 1222622 | 2/1971 | United Kingdom . |
| 1380659 | 1/1975 | United Kingdom . |
| 1416357 | 12/1975 | United Kingdom . |
| 1495776 | 12/1977 | United Kingdom . |
| 1497577 | 1/1978 | United Kingdom . |
| 2011317 | 7/1979 | United Kingdom . |
| 2015426 | 9/1979 | United Kingdom . |
| 2019781 | 11/1979 | United Kingdom . |
| 2027720 | 2/1980 | United Kingdom . |
| 2029317 | 3/1980 | United Kingdom . |
| 2030927 | 4/1980 | United Kingdom . |
| 2033838 | 5/1980 | United Kingdom . |

Primary Examiner—Alexander Thomas
Attorney, Agent, or Firm—John J. Toney; William D. Lee, Jr.; Joseph P. Harps

[57] ABSTRACT

A heat sealable and shrinkable, coextruded, multi-layer packaging film having a propylene homopolymer base layer and a skin layer of a preferred blend of 60% to 80% propylene-ethylene copolymer with propylene homopolymer provides a sealing temperature range of up to 30° C.

6 Claims, No Drawings

HEAT SEALABLE, MULTI-PLY POLYPROPYLENE FILM

This is a continuation of application Ser. No. 152,970, filed May 23, 1980 now abandoned.

FIELD OF THE INVENTION

This invention relates to thermoplastic, heat shrinkable packaging films, particularly, polypropylene films having improved heat sealing characteristics. These films can be used to package a wide variety of food and non-food items.

BACKGROUND OF THE INVENTION

Oriented polypropylene films are useful and widely accepted packaging films because of their good moisture barrier, stiffness, high strength, and optical properties. However, films of polypropylene do not, in general, exhibit good heat sealing properties which is an important consideration in packaging applications. This is because polypropylene films have very narrow sealing temperature ranges.

The sealing temperature range for a thermoplastic film can be considered as beginning at that point where upon application of heat and pressure the surfaces of the film will seal or bond together. As temperature is increased further, a point is reached where the thermoplastic melts and flows quite readily thus making it difficult to achieve a seal in a specific area thus marking the upper end of the sealing range. Also at the upper end of the sealing range the film may tend to burn and char leaving weak and unsightly seals. For propylene homopolymer film, as temperature is increased, the film does not become sealable but rather suddenly flows undesirably as its melting point is approached making it quite difficult to achieve smooth, continuous, satisfactory seals. This type of sealing performance can not be tolerated on high speed packaging equipment.

In order to get good heat sealability, it has been the practice to apply various types of coatings to the films. Coatings have conventionally been applied in separate coating operations, such as from emulsions, extrusion coating, and so forth, but such operations are costly and require additional handling of the film. Coextrusion has been used successfully to put a heat sealable coating on polypropylene and produce a film of good seal strength, but until the present invention coextruded polypropylene film laminates had a very narrow heat seal range, and were expensive to produce. Accordingly, it is a principal object of the present invention to provide a polypropylene film having a wide sealing range.

Another object of the present invention is to provide a polypropylene film having acceptable seal strength for shrink packaging applications.

Typical patents which disclose coatings for polypropylene film are U.S. Pat. No. 3,285,766 which issued on Nov. 15, 1966 to Edward Barkis et al which discloses a method of extruding a coating containing at least 65% ethylene onto a sheet of polypropylene; U.S. Pat. No. 3,671,383 which issued on June 20, 1972 to Rikita Sakata et al which discloses a biaxially oriented polypropylene film laminated to a uniaxially oriented ethylene-propylene copolymer film with at least 75% by weight polypropylene; U.S. Pat. No. 4,132,050 which issued on Jan. 2, 1979 to Roger N. Young and which discloses a film having a substrate formed of a blend of 87.5 to 60 parts of polypropylene and 12.5 to 40 parts of ethylene-propylene block copolymer with a heat sealable layer; and, U.S. Pat. No. 4,148,972 which issued on Apr. 10, 1979 to Toshi Hiro Yamane et al which discloses a polypropylene film laminate made by laminating a polypropylene layer having 1 to 8 weight percent of an ionomer with an ionomer layer.

SUMMARY OF THE INVENTION

It has been surprisingly discovered that the principal objects of the present invention, namely, increasing the seal temperature range of a multi-layer polypropylene film and providing acceptable seal strength for such a film, can be achieved by a multi-layer film which comprises a base layer of propylene homopolymer and a skin layer affixed to one surface of the base layer wherein the skin layer comprises a blend of 50% to 100% by weight of propylene-ethylene copolymer with 50% to 0% by weight of propylene homopolymer. The preferred blend is 60% to 80% copolymer with 40% to 20% homopolymer. In a particularly desirable embodiment, the skin layer has 70% by weight of propylene-ethylene copolymer blended with 30% by weight of propylene homopolymer and the copolymer contains 2 to 6% by weight of ethylene, or even more preferably, 3% to 4% ethylene by weight. In addition, the ratio of the thickness of the base layer to the thickness of the skin layer is preferably 4:1 or greater.

In another aspect, the subject invention is a method of increasing the sealing temperature range of propylene homopolymer film comprising the steps of providing a base layer of propylene homopolymer; and, laminating a skin layer to at least one side of the propylene homopolymer film wherein the skin layer comprises a blend of 60 to 80% by weight of propylene-ethylene copolymer having 2 to 6% by weight of ethylene; and, biaxially stretching the laminated film to a final total film thickness in the range of 0.25 to 2.5 mils. Such a film will have a sealing range of at least 20° C. and will produce a seal strength of greater than 300 gms/inch. A preferred method of producing the laminated film is to coextrude the skin layer and the base layer.

Still another aspect of the subject invention is a method of producing a heat sealed and shrunken package of polypropylene film comprising the steps of providing a base layer of propylene homopolymer film; laminating a skin layer to at least one side of said propylene homopolymer film, said skin layer comprising a blend of 60% to 80% by weight of propylene-ethylene copolymer having 2 to 6% by weight of ethylene; biaxially stretching the laminated film to a final total film thickness in the range of 0.25 to 2.5 mils thereby producing a heat sealable, heat shrinkable film; providing a product be wrapped; overwrapping the product with film and bringing skin layer surfaces into contact with each other at points to be heat sealed; applying heat and pressure at the points to be sealed thereby sealing said film at said points, the sealing temperature range of said applied heat being in the range of 135° C. to 160° C., the heat seals of the resulting package having a minimum strength of 300 gms/inch; and, applying heat in the range of 110° C. to 135° C. to said package for time sufficient to shrink said film about said product.

In all aspects of the subject invention, the film may be perforated.

PREFERRED EMBODIMENT

The preferred embodiment of the present invention is a two layer film made by blending 70% by weight of propylene-ethylene copolymer having 3.5 to 4.2% by weight of ethylene with 30% by weight of propylene homopolymer for the skin or outside layer. This mixture is blended in a Banbury blender and then fed into the hopper of an extruder which feeds into an annular die for extruding a tube having two layers. The inside or base layer comprises propylene homopolymer which is fed into the hopper of a second extruder which also feeds the annular die to provide the inside layer.

In the annular die the two tubular extrudates are joined to become a multi-layer tubular laminate. This tubular laminate is rapidly cooled and then collapsed. Afterwards, the tubing is inflated and heated to the orientation temperature range of polypropylene which is in the range of 135° C. to 150° C. The heating takes place in an oven, and as the flattened film emerges from the oven, it passes through pinch rolls and is opened to a bubble by the well known trapped bubble technique where it is is stretched about five times in both vertical and horizontal directions which reduces the film to a thickness in the range of 0.60 to 0.80 mils. Prior to stretching the typical tubing would have a thickness of about 18 mils with the thickness ratio of the polypropylene layer to the blended layer being 5:1. A description of one such bubble technique for biaxially orienting polypropylene is given in U.S. Pat. No. 3,260,776 which issued on July 17, 1966 to C. A. Lindstrom et al.

After the film has been expanded into the bubble and the bubble cooled, it is collapsed, slit, and wound up.

In some instances it is desirable to perforate the film so that an array of perforations or small holes are made in the film. Depending on the desired application, the number of holes may be from eight to ten per square inch of film up to several hundred holes per square inch and the holes may run anywhere from 2 to 20 mils in diameter. A typical apparatus for perforating the film will employ a cooled grid over which the film is passed while it is exposed to a jet of hot gas which will melt the film in the uncooled areas. Such an apparatus and method are described in U.S. Pat. No. 3,038,198 which issued on June 12, 1962 to C. H. Schaar.

To determine the sealing range and seal strength of the preferred film two sheets of the film were superposed with the skin layer surfaces in contact. An electrical resistance heated flat sealing bar 5 mm. wide was used to press the sheets together against a backing surface with a pressure of 1 kg./sq.cm. for 0.5 second and the temperature of the sealing bar was recorded. After the sealing had been completed a one inch strip was cut perpendicular to and across the seal made by the bar, and the ends of the respective strips were placed in the jaws of an Instron testing machine with the seal located at approximately the mid point between the gripping jaws. Force was applied by driving the jaws apart until the seal either peeled or broke. Seals having a minimum strength of approximately 300 gms/inch, the minimum considered sufficient for packaging applications, were achieved by the preferred embodiment at a seal bar temperature as low as 135° C. and satisfactory seals continued to be made as temperature increased up to about 160° C. for a sealing range of approximately 25° C. (Hereinbelow, field tests indicate that the operable range is 30° C.). A maximum seal strength of about 1,400 gms/inch was achieved.

As stated previously, a monolayer polypropylene film will have an essentially "zero" width sealing range. Because seal bars are cooled by contact with film, in packaging machinery it is the necessary practice with polypropylene to set the temperature of the seal bars somewhat above the melting point so that a sealed package can be obtained but seals made in this way have a poor appearance and burned zones. With a film such as that of the present invention, setting the seal bars and temperatures near the top of the sealing range does not run the risk of melting the film or burning it plus at high speeds where the film tends to cool the seal bars, the seal bars will still maintain sufficient heat to seal the film and not be cooled below the sealing range.

A number of products can be packaged in the film of the present invention and the various machines use different techniques. In some instances, the product is placed on one sheet of film and then a second sheet is laid over the product and a complete perimeter seal is then made; and, in some instances the sealing operation also severs the excess film to trim the package. After sealing, the product passes through a heat tunnel which may have a temperature as low as 110° C. but is usually set in the range in which the film was stretched. In the tunnel the heat causes the stretch tensions to release and causes the film to shrink around the product. In other packaging processes the product may be placed between the folds of a center folded film and a seal on the remaining three unsealed sides is made. Many well known methods of over-wrapping a product in shrink film are understood by those skilled in the art.

Products such as bread, soft bakery products including rolls, pizzas, and the like may be packaged with the film of the present invention. Also food products requiring breathing through the film such as fruits and vegtables may be packaged using the perforated film.

EXAMPLES

In order to solve the problem presented by the virtually non-existent heat sealing range of polypropylene, a number of blended sealing layer compositions were tried. Listed below in Table I are the two layer films having a polypropylene homopolymer base or substrate layer which has been coextruded with the specifically designated sealing layer composition. Only those compositions which could be successfully processed by the trapped bubble technique into film are shown in Table I. The footnotes immediately below the table explain the abbreviations for the polymers, and sealing range and seal strength were determined as explained hereinabove. Haze, of course, is the percentage of transmitted light which in passing through the specimen deviates from the incident beam more than 2.5° on the average and which is determined by ASTM Method D1003. The measurement of thickness reported is of the total film laminate.

TABLE I

| EXAMPLE | SEALING LAYER COMPOSITION | THICKNESS (mils) | SEALING RANGE (°C.) | MIN. SEAL TEMP. TO HAVE 300 G/INCH | MAX. SEAL STRENGTH (G/INCH) | HAZE % |
|---|---|---|---|---|---|---|
| 1 | 100% PP | 0.70 | ZERO | — | 500 | 1.0 |
| 2 | 90/10 PP/PB | 0.71 | 5 | 155 | 850 | 1.1 |
| 3 | 80/20 PP/PB | 0.69 | 10 (15-20) | 150 | 500 | 1.3 |
| 4 | 75/25 PP/EVA | 0.79 | 5 | 155 | 300 | 2.8 |

TABLE I-continued

| EXAMPLE | SEALING LAYER COMPOSITION | THICKNESS (mils) | SEALING RANGE (°C.) | MIN. SEAL TEMP. TO HAVE 300 G/INCH | MAX. SEAL STRENGTH (G/INCH) | HAZE % |
| --- | --- | --- | --- | --- | --- | --- |
| 5 | 50/50 PP/EVA | 0.77 | 5 | 155 | 300 | 2.9 |
| 6 | 90/10 PP/SURLYN | 0.80 | 5 | 155 | 350 | 1.5 |
| 7 | 80/20 PP/SURLYN | 0.72 | 5 | 155 | 400 | 1.9 |
| 8 | 50/40/10 PP/P—E/SURLYN | 0.75 | 10 | 150 | 1200 | 1.1 |
| 9 | 50/50 PP/P—E | 0.73 | 10 | 150 | 1400 | 0.31 |
| 10 | 40/60 PP/P—E | 0.74 | 20 to 25 | 140 | 1550 | 0.70 |
| 11 | 30/70 PP P—E | 0.73 | 25 to 30 | 135 | 1400 | 2.0 |
| 12 | 100% P—E | 0.70 | 30 | 130 | 1200 | 2.4 |

PP = Propylene homopolymer (Film graderesin, predominately isotatic polymer)
PB = Polybutylene
P—E = Propylene-ethylene copolymer (Approx. 4% Ethylene)
SURLYN = Type 1601 from DuPont
EVA = Ethylene-vinyl acetate copolymer having approx. 10% vinyl acetate Examples 3, 10, and 11 are expressed as ranges because these samples were run on actual equipment in the field as well as having their sealing range measured in the laboratory and, in the field, about a 5° C. increase in sealing temperature range was observed thus increasing the upper seal temperature to about 165° C. These three samples were run as perforated films packaging rolls and crusty bread. Each of these films had good machinability, i.e. they were stiff enough to perform well in standard packaging equipment.

The film according to Example 11 also performed well in the field for packaging crescent rolls and pizzas with non-perforated film.

Looking at Table I it is evident that Examples 10, 11, and 12 have desirably wide sealing ranges and each of these films has good machinability and the haze is not objectionable. However, above approximately 80% propylene-ethylene copolymer in the blend processability problems in the trapped bubble process become pronounced as the sealing layer tends to flow and distort at the high temperature needed to stretch and orient the polypropylene base layer. In other words, the propylene-ethylene copolymer is beginning to melt at the orientation temperature of the propylene homopolymer and the sealing layer being on the outside of the tubing tends to stick to pinch rolls after being heated but prior to being blown into a bubble. Thus, the preferred range for the propylene-ethylene copolymer in the sealing layer blend is from 60 to 80% by weight and this gives a sealing temperature range which varies from 20° C. to 30° C. The composition of Example 11 is the best all around combination of seal temperature range, seal strength, processability on present state of the art film manufacturing equipment, and machinability. On commercial packaging machinery 50 to 80 packages per minute can be made and the indications are that these rates can be successfully exceeded.

By coextruding the base layer and skin as a flat sheet from a slot die, rapidly cooling the sheet, and using a tenterframe to stretch the flat sheet when heated to orientation temperature continuous manufacture of a film in which the skin layer blend is greater than 80% could be achieved but trim wastage and other factors make the tenterframe method less attractive. In any event, it should be recognized that the widening of the heat seal range begins noticeably with a skin layer blend of at least 50% copolymer and continues up to 100% copolymer.

The propylene homopolymer used in the present invention is predominately isotatic polypropylene of film grade available from a number of well known resin suppliers. Likewise, the propylene-ethylene copolymer is a random copolymer of film grade also available from well known resin producers and the ethylene weight percentage is in the range of 2% to 6% which will perform satisfactorily. With a higher percentage of ethylene in the copolymer it is to be expected that the percentage of the copolymer in the blend may be increased.

The layer thickness ratios of the multi-layer film of this invention are those which give the optimum combination of machineability, sealability and processability. If the sealing layer thickness is increased much beyond the 4:1 ratio processing problems are incurred as explained above at the orientation temperature of polypropylene. Thus, the base layer to sealing layer ratio should be greater than 4:1 and as noted above, a 5:1 ratio gives quite satisfactory performance. In addition, a total film thickness in the range of 0.25 to 2.5 mil produces the most satisfactory combination of film characteristics.

Also within the scope of this invention are three layer films where the central layer is the propylene hompolymer layer which is oriented and the sealing layers are on both sides of the oriented hompolymer layer to give it balance. This is to prevent curl which can occur in structurally unbalanced, multi-layer films.

Having described by invention, I claim:

1. A heat-sealable, multi-layer film for packaging comprising:
   (a) a base layer comprising propylene homopolymer; and,
   (b) a skin layer affixed to one surface of said base layer comprising a blend of 60% to 80% by weight of film grade, thermoplastic propylene-ethylene copolymer with 40% to 20% by weight of propylene homopolymer, the ratio of thickness of the base layer to skin layer being at least 4:1.

2. The heat sealable film of claim 1 wherein said film is heat shrinkable, the ratio of the thickness of the base layer to the skin layer is at least 4:1, and said blend comprises 60% to 80% by weight of propylene-ethylene copolymer with 40% to 20% by weight of propylene homopolymer, said copolymer comprising 2% to 6% by weight of ethylene.

3. The heat sealable film of claim 1 wherein said film has a sealing range of at least 20° C.

4. The heat sealable film of claim 1 wherein said film is perforated.

5. The heat sealable film of claim 1 having a skin layer affixed to both sides of the base layer to structurally balance said film.

6. The heat sealable film of claim 1 wherein said film will produce a film having a seal strength of at least 300 gms/inch at a temperature as low as 135° C.

* * * * *